(12) United States Patent
Ervin et al.

(10) Patent No.: US 9,969,333 B2
(45) Date of Patent: May 15, 2018

(54) EXTENDABLE MIRROR ASSEMBLY FOR A VEHICLE

(71) Applicant: Deere & Company, Moline, IL (US)

(72) Inventors: Jacob E. Ervin, Moline, IL (US);
Kevin T. McCulloch, Moline, IL (US);
Shawn M Bartz, Moline, IL (US);
James A. Newhouse, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 0 days. days.

(21) Appl. No.: 15/416,742

(22) Filed: Jan. 26, 2017

(65) Prior Publication Data
US 2017/0327040 A1    Nov. 16, 2017

Related U.S. Application Data

(60) Provisional application No. 62/336,265, filed on May 13, 2016.

(51) Int. Cl.
*B60R 1/07* (2006.01)
*B60R 1/078* (2006.01)

(52) U.S. Cl.
CPC .............. *B60R 1/07* (2013.01); *B60R 1/078* (2013.01)

(58) Field of Classification Search
CPC ................................. B60R 1/07; B60R 1/078
USPC ...................................................... 359/841
See application file for complete search history.

(56) References Cited

U.S. PATENT DOCUMENTS

| 2,241,866 | A | * | 5/1941 | Needham | B60R 1/078 248/480 |
| 2,570,536 | A | * | 10/1951 | Fellabaum | B60R 1/064 248/279.1 |
| 2,713,810 | A | * | 7/1955 | Hill | B60R 1/064 248/279.1 |
| 2,717,531 | A | * | 9/1955 | Schenck | B60R 1/078 248/299.1 |

(Continued)

FOREIGN PATENT DOCUMENTS

| DE | 3938961 | 5/1991 |
| DE | 102011002295 | 8/2012 |

(Continued)

OTHER PUBLICATIONS

Extendable Mirror Assembly—John Deere Part No. RE580078, available to the public before May 12, 2015 (2 pages, which includes a Statement of Relevance).

(Continued)

*Primary Examiner* — Ricky D Shafer
(74) *Attorney, Agent, or Firm* — Michael Best & Friedrich LLP

(57) ABSTRACT

An extendable mirror assembly configured to be coupled to a vehicle includes a drive assembly, a mirror moveable between a retracted position and an extended position, and a support arm including a first end opposite a second end. The second end of the support arm is coupled to the mirror and a flange is coupled to the first end of the support arm. A support body is coupled to the support arm by the flange and is configured to translate along an axis in response to actuation of the drive assembly to move the mirror between the retracted position and the extended position.

12 Claims, 7 Drawing Sheets

(56) References Cited

U.S. PATENT DOCUMENTS

| | | | | |
|---|---|---|---|---|
| 4,558,930 | A | * | 12/1985 | Deedreek ................ B60R 1/078 248/480 |
| 4,936,670 | A | * | 6/1990 | Yoo ........................ B60R 1/078 248/480 |
| 5,572,376 | A | * | 11/1996 | Pace ....................... B60R 1/078 359/862 |
| 6,213,609 | B1 | * | 4/2001 | Foote ...................... B60R 1/074 248/900 |
| 6,276,808 | B1 | * | 8/2001 | Foote ...................... B60R 1/078 248/472 |
| 6,325,518 | B1 | * | 12/2001 | Whitehead .............. B60R 1/078 248/478 |
| 6,505,943 | B1 | * | 1/2003 | Olijnyk ................... B60R 1/078 248/900 |
| 6,755,543 | B1 | * | 6/2004 | Foote ...................... B60R 1/072 359/838 |
| 6,871,970 | B2 | | 3/2005 | Georges |
| 7,261,428 | B1 | | 8/2007 | Ruse et al. |
| 2009/0080096 | A1 | * | 3/2009 | Fimeri ..................... B60R 1/07 359/841 |

FOREIGN PATENT DOCUMENTS

| | | |
|---|---|---|
| FR | 2574726 | 6/1986 |
| WO | 03/022635 | 3/2003 |

OTHER PUBLICATIONS

Extendable Mirror Assembly—John Deere Part No. RE574765, available to the public before May 12, 2015 (2 pages, which includes a Statement of Relevance).

DE102017205894.3 Search Report from the German Intellectual Property Office dated Nov. 20, 2017 (17 pages, which includes a Statement of Relevance).

* cited by examiner

US 9,969,333 B2

EXTENDABLE MIRROR ASSEMBLY FOR A VEHICLE

CROSS-REFERENCE TO RELATED APPLICATIONS

This application claims priority to U.S. Provisional Patent No. 62/336,265, filed May 13, 2016, the content of which is incorporated herein by reference.

BACKGROUND

The present disclosure relates to an extendable mirror assembly for a vehicle.

SUMMARY

In one aspect, an extendable mirror assembly is configured to be coupled to a vehicle and includes a drive assembly, a mirror moveable between a retracted position and an extended position, and a support arm including a first end opposite a second end. The second end of the support arm is coupled to the mirror and a flange is coupled to the first end of the support arm. A support body is coupled to the support arm by the flange and is configured to translate along an axis in response to actuation of the drive assembly to move the mirror between the retracted position and the extended position.

In another aspect, a vehicle includes a cab for supporting an operator of the vehicle and an extendable mirror assembly. The mirror assembly includes a mirror base coupled to the vehicle adjacent the cab. A drive assembly is coupled to the mirror base and is operable to move a mirror between a retracted position and an extended position. A support arm includes a first end and a second end, with the second end coupled to the mirror. A fastening interface member is fixedly attached to the first end of the support arm. A support body is coupled to the support arm by the fastening interface member. The support body is cooperatively engaged with the drive assembly to move along an axis defined by the drive assembly for movement of the mirror between the retracted position and the extended position.

In yet another aspect, a method of assembling an extendable mirror assembly configured to be secured to a vehicle includes coupling a support body to a rotatable drive assembly. The method also includes coupling a support arm to the support body via a flange affixed to a first end of the support arm such that the support arm and the support body are configured to move along an axis defined by the drive assembly and in response to actuation of the drive assembly. The method further includes coupling a mirror to a second end of the support arm.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
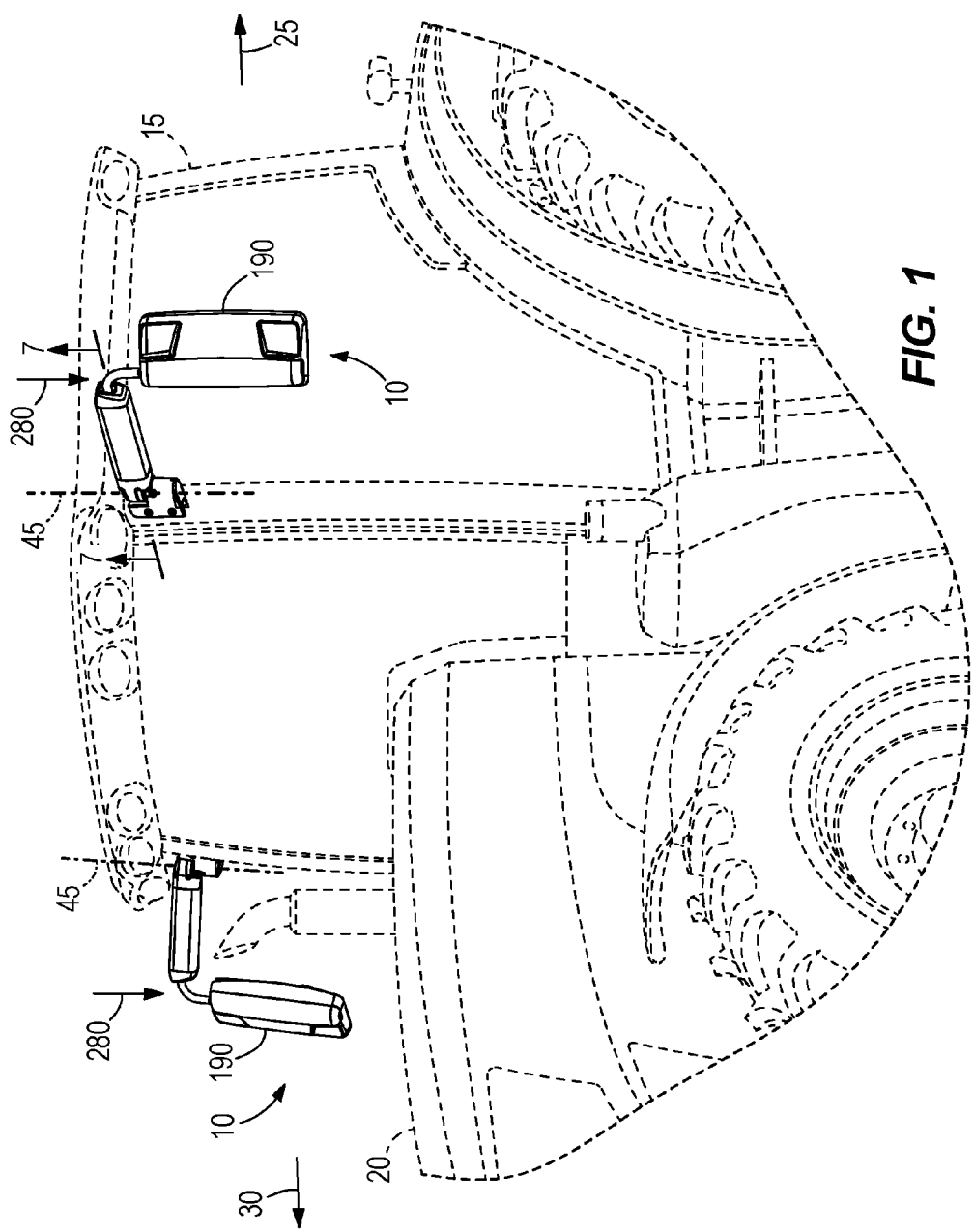
FIG. 1 is a perspective view of a vehicle including extendable mirror assemblies in a retracted position according to an embodiment of the disclosure.
Figure 2:
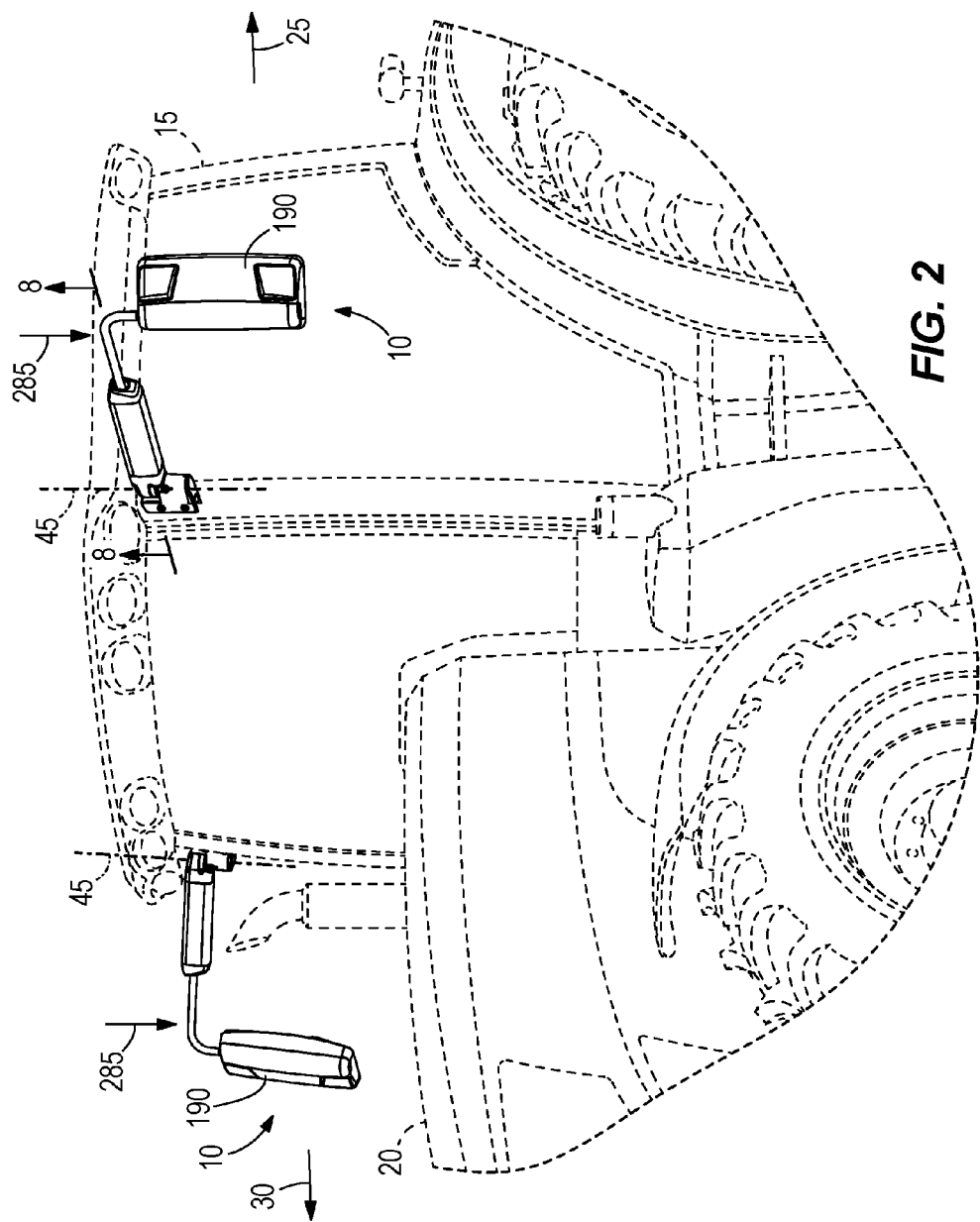
FIG. 2 is a perspective view of the vehicle of FIG. 1 including the extendable mirror assemblies in an extended position.

FIGS. 1 and 2 illustrate extendable mirror assemblies 10 coupled to a cab 15 of a vehicle 20. In the illustrated embodiment, the vehicle 20 is an agricultural tractor; however, in other embodiments, the extendable mirror assemblies 10 may be coupled to different types of vehicles (e.g., construction vehicles, forestry vehicles, mining vehicles, etc.). The illustrated extendable mirror assemblies 10 are adjustably moveable between a retracted position (FIG. 1) and an extended position (FIG. 2). In either the retracted or extended positions, the extendable mirror assemblies 10 are configured to provide a rear view 25 behind the vehicle 20 to an operator of the vehicle 20 while the operator is looking forward 30 within the cab 15. The extendable mirror assemblies 10 are moveable into the retracted position when the vehicle 20 is not towing another piece of equipment (e.g., a trailer, an agricultural baler, etc.) behind the vehicle 20 and are moveable into the extended position when the vehicle 20 is towing such equipment to permit the operator to see and see behind the towed equipment.

Figure 3:
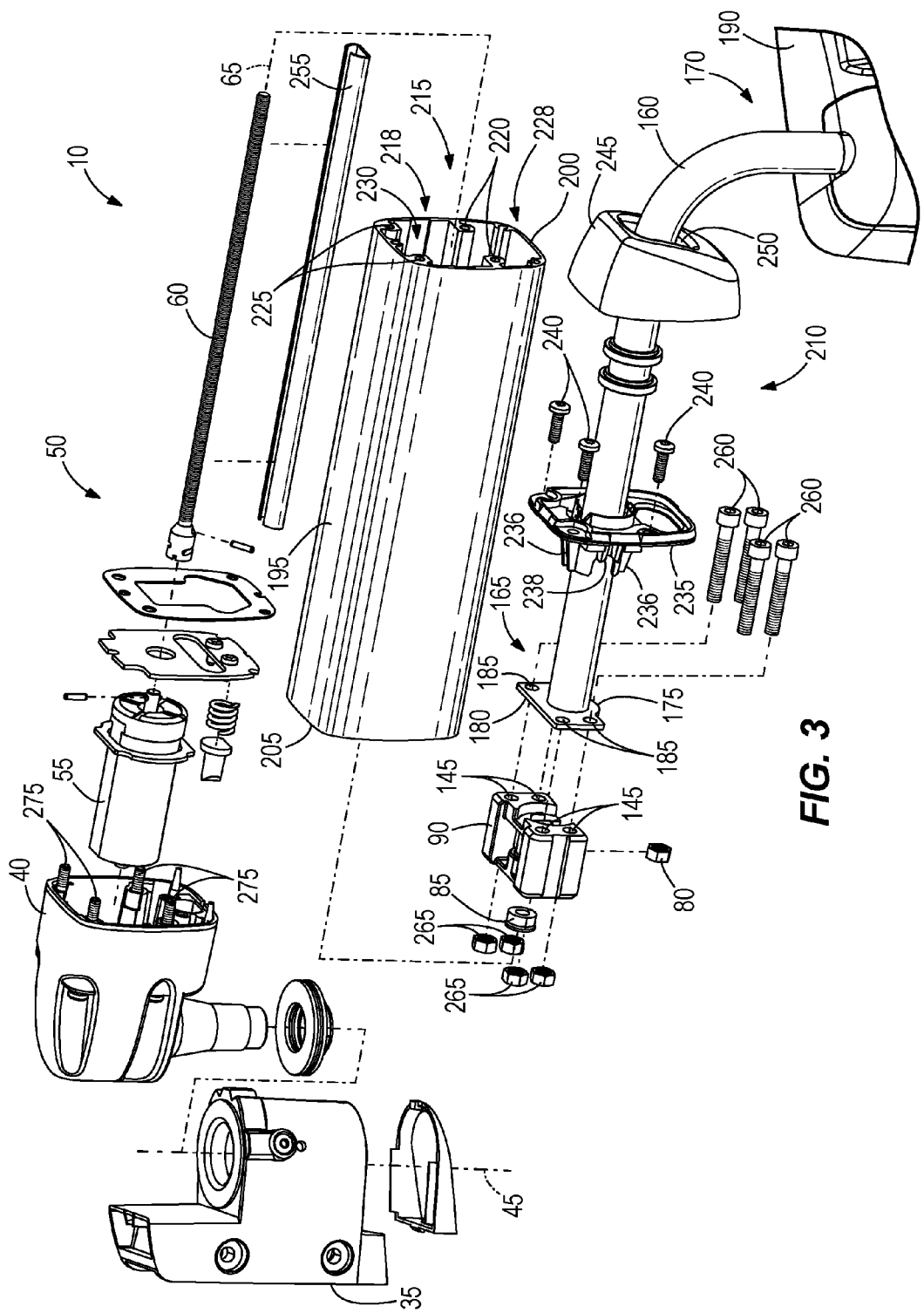
FIG. 3 is an exploded view of one extendable mirror assembly of FIG. 1.
Figure 4:
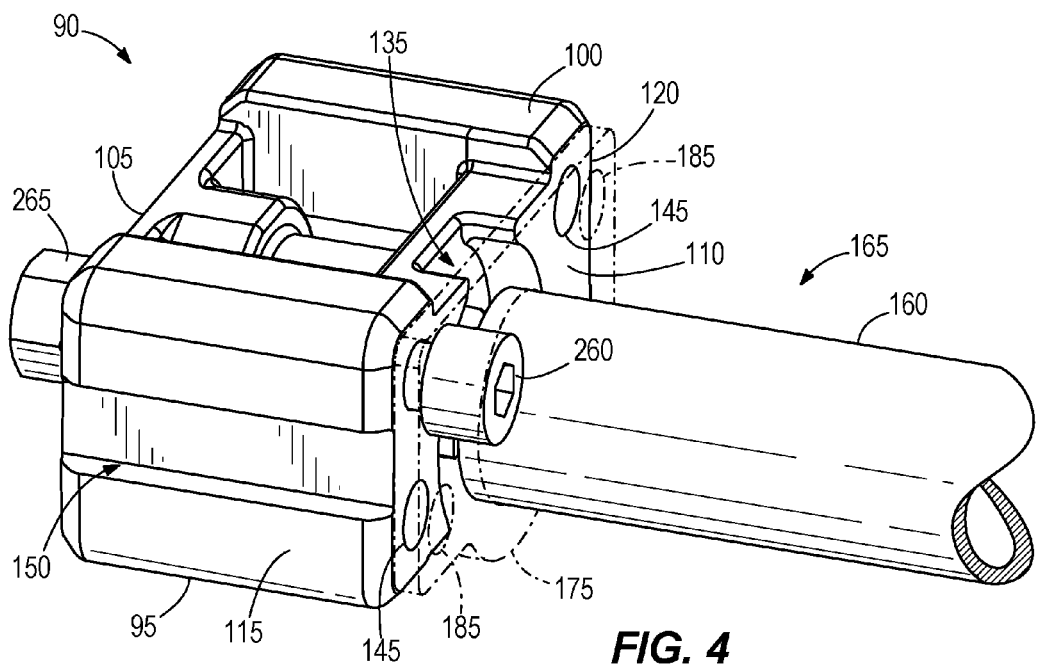
FIG. 4 is a top perspective view of a portion of one extendable mirror assembly of FIG. 1 including a support arm coupled to a support body.
Figure 6:
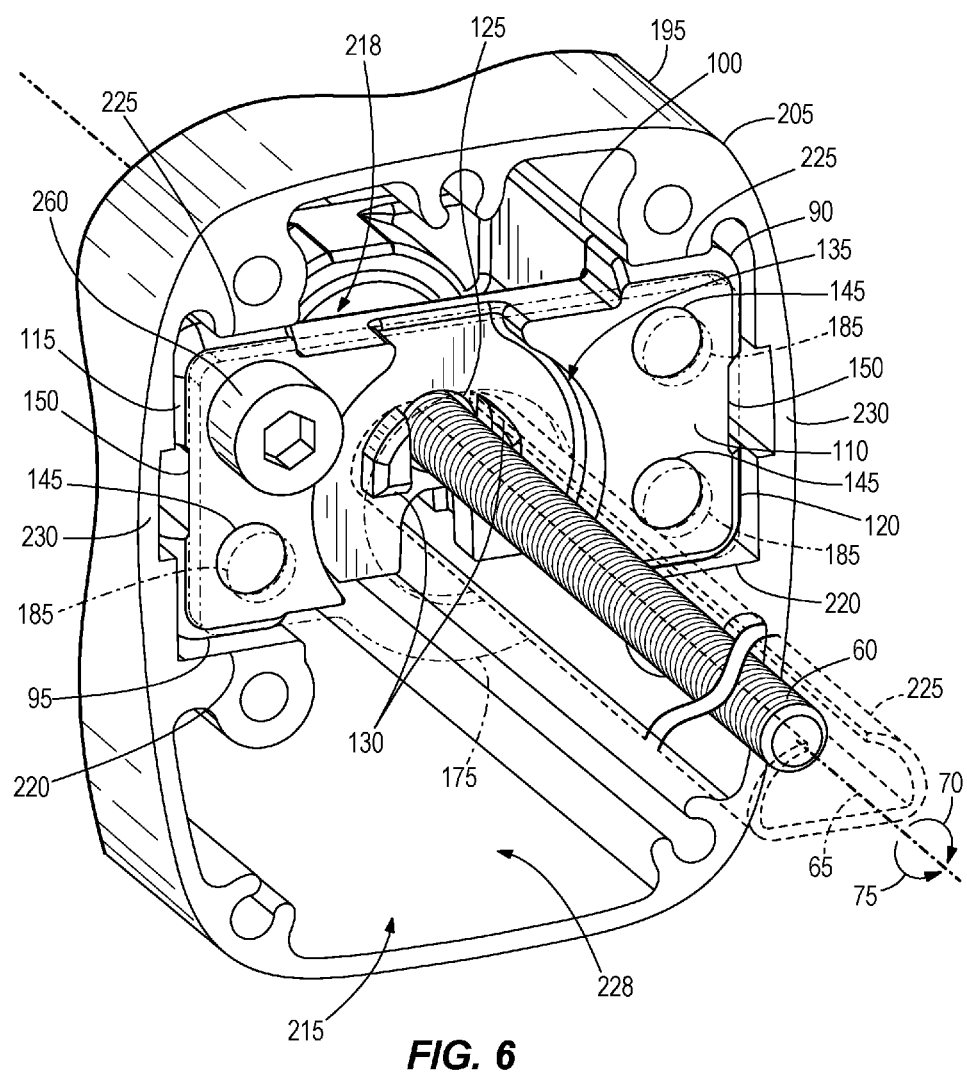
FIG. 6 is a perspective view of a portion of one extendable mirror assembly of FIG. 1 illustrating a threaded stud extending through the support body that is received within a housing.
Figure 7:
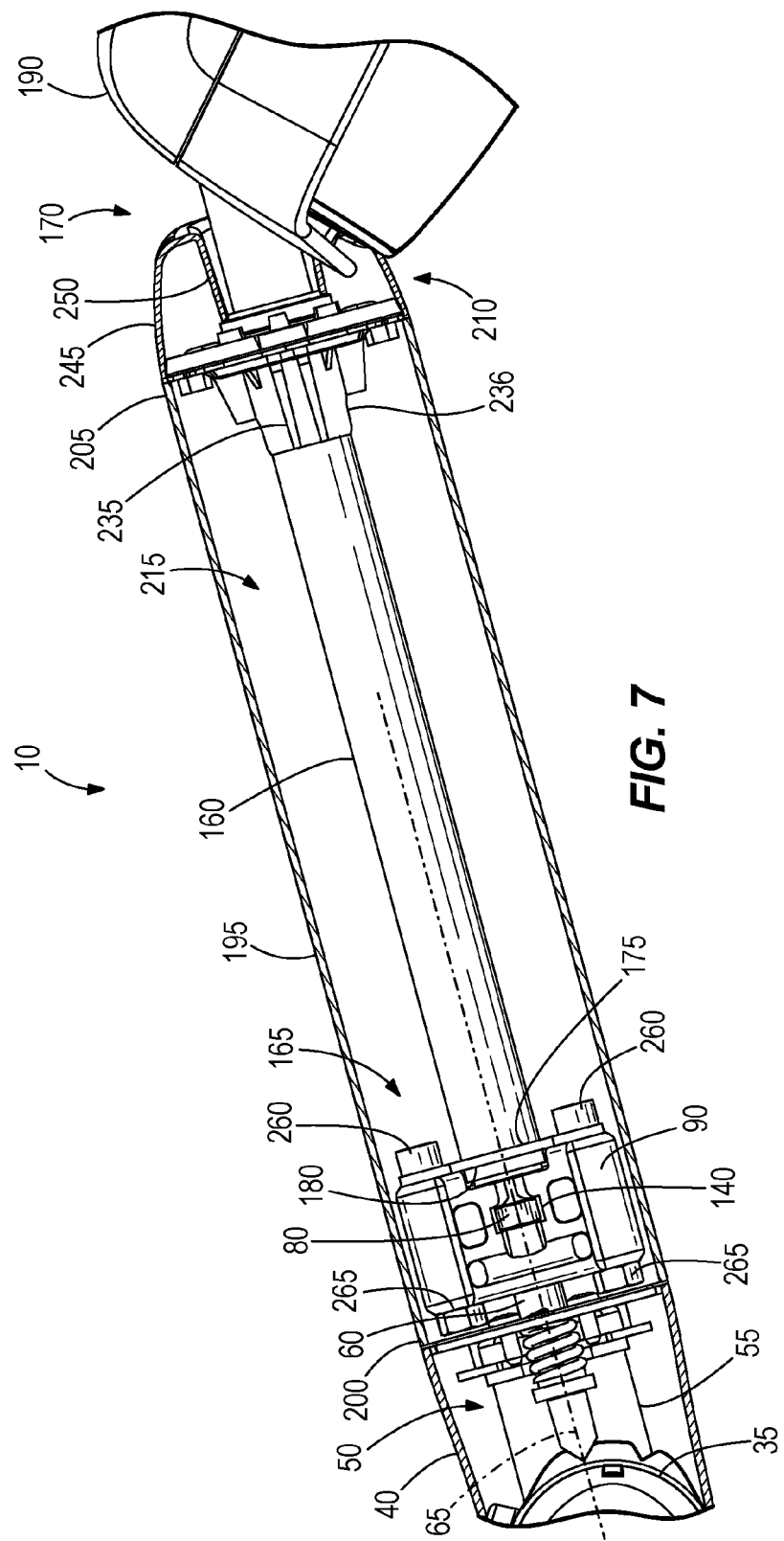
FIG. 7 is a cross sectional bottom view of one extendable mirror assembly taken along 7-7 of FIG. 1 within the retracted position.
Figure 8:
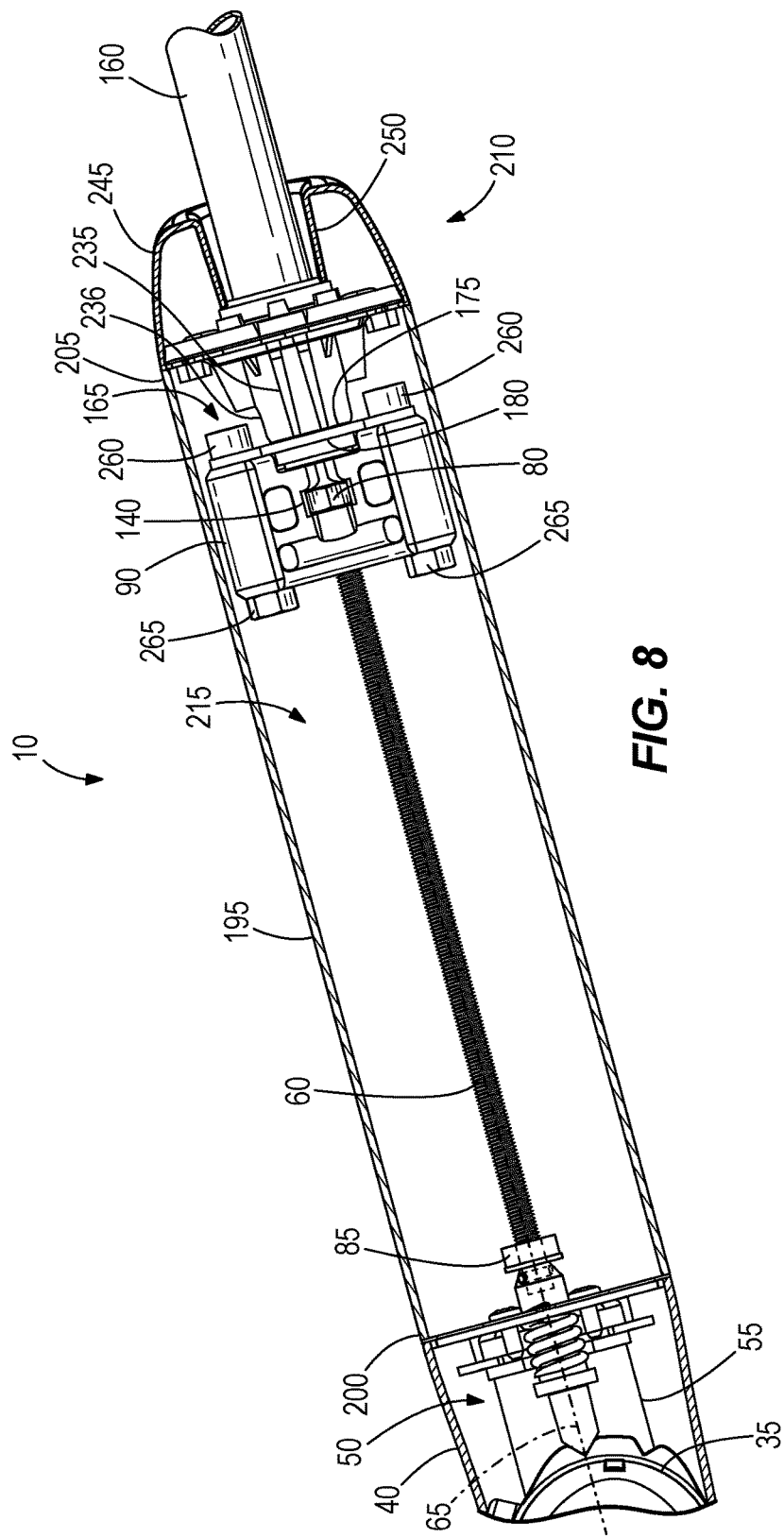
FIG. 8 is a cross sectional bottom view of one extendable mirror assembly taken along 8-8 of FIG. 1 within the extended position.

With reference to FIG. 3, an exploded view of one of the extended mirror assemblies 10 is illustrated. The extendable mirror assembly 10 includes a mirror base 35 fixedly attached to the cab 15 and a pivot base 40 pivotably coupled to the mirror base 35 about a pivot axis 45 (FIGS. 1-3). The pivot base 40 supports a drive assembly 50 including an electric motor 55 coupled to a threaded stud or power screw 60 for rotation of the threaded stud 60 about a rotational axis 65 in a first rotational direction 70 and a second rotational direction 75 (FIG. 6). In the illustrated embodiment, the threaded stud 60 threadably engages a nut 80, and a stop 85 is fixed to the threaded stud 60 adjacent the electric motor 55 (FIG. 8).

Figure 5:
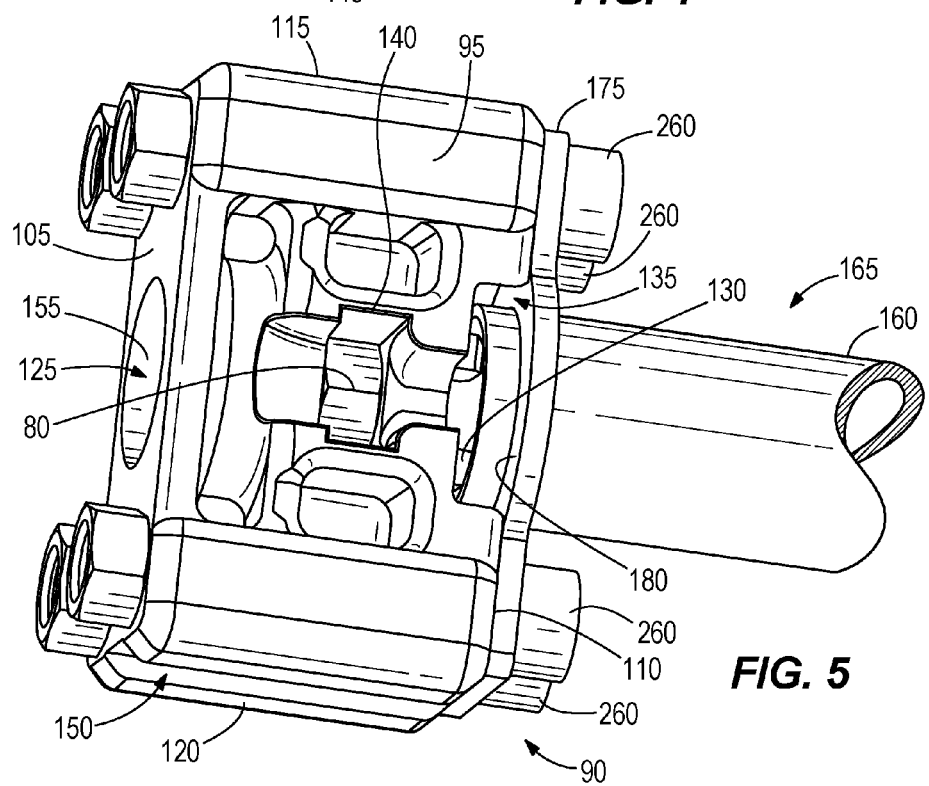
FIG. 5 is a bottom perspective view of the portion of FIG. 4.

With reference to FIGS. 3-6, a support body 90 defines a substantially cuboidal member having a bottom surface 95, a top surface 100, a back surface 105, a front or contact surface 110, a first side surface 115, and a second side surface 120. The front surface 110 defines a plane oriented substantially perpendicular to the rotational axis 65. The support body 90 also includes a central aperture 125 extending therethrough that is sized to receive the threaded stud 60 (FIG. 6). The front surface 110 includes projections 130 located within a first recess 135 that are positioned on opposing sides of the central aperture 125 and extend away from the back surface 105. The bottom surface 95 includes a slot 140 in communication with the central aperture 125 (FIG. 5). The illustrated slot 140 is sized and formed to receive the nut 80 such that the nut 80 is substantially fixed relative to the support body 90 (e.g., the nut 80 is inhibited from axial or rotational movement relative to the support body 90). Extending between the front surface 110 and the back surface 105 are four apertures or through-holes 145 oriented substantially parallel to the rotational axis 65. The first side surface 115 and the second side surface 120 each include an exterior channel 150 extending between the front surface 110 and the back surface 105. The back surface 105 includes a second recess 155 concentric with and in communication with the central aperture 125 (FIG. 5) and sized to receive the stop 85.

With reference again to FIG. 3, a support arm 160 generally defines a hollow J-shaped member including a first end 165 opposite a second end 170. The first end 165 is coupled to a flange, plate, or fastening interface member 175. The illustrated flange 175 includes a contact surface 180 that faces the front surface 110 of the support body 90 (FIG. 5) such that the contact surface 180, which defines a plane, is oriented generally perpendicular to the rotational axis 65 (e.g., the front surface 110 and the contact surface 180 define parallel planes). The flange 175 also includes four apertures 185 that each align with one of the through-holes 145 of the support body 90. In the illustrated embodiment, the flange 175 is fixedly coupled to the support arm 160 by welding. In other embodiments, the flange 175 may be fixedly coupled to the support arm 160 by a brazing process, a press-fit engagement, an adhesive process, etc. In further embodiments, the flange 175 and the support arm 160 may be constructed as one integrally formed piece. The second end 170 of the support arm 160 is coupled to a mirror assembly 190 (e.g., a mirror housing that supports a mirror). In the illustrated embodiment, the mirror assembly 190 is fixed non-rotatably to the support arm 160; however, in other embodiments, the mirror assembly 190 is rotatably coupled to the support arm 160.

A housing 195 formed as a tubular member includes a first end 200 coupled to the pivot base 40 and a second end 205 coupled to an end cap assembly 210. The illustrated housing 195 defines a cavity 215 having a first region 218 between lower support ledges 220 and upper support ledges 225 and a second region 228 located below the lower support ledges 220. The illustrated lower and upper support ledges 220, 225 extend between the first and second ends 200, 205 of the housing 195. Located between both pairs of lower and upper support ledges 220, 225 is a channel 230 extending the entire length of the housing 195 in a side wall thereof. The illustrated end cap assembly 210 includes a stop member 235 fixedly attached to the second end 205 by fasteners 240 engaging the upper and lower support ledges 220, 225 and a cover 245 that is coupled to the stop member 235 by, for example, a snap-fit connection. The stop member 235 includes protrusions 236 extending toward the flange 175 and a central aperture 238 located between the protrusions 238. The cover 245 includes a central aperture 250 with both central apertures 238, 250 slidably receiving a portion of the support arm 160.

During assembly of the extendable mirror assemblies 10, a guard 255 is fixedly coupled to the projections 130, for example, by a press-fit engagement. In other embodiments, the guard 255 may be welded, brazed, adhered, formed over, etc. the projections 130. The illustrated guard 255 generally aligns with the central aperture 125 such that the rotational axis 65 extends through the guard 255 (FIG. 6). The guard 255 is insertable within the first end 165 of the support arm 160.

The support arm 160 and the flange 175 are coupled to the support body 90 by four fasteners 260 inserted through a corresponding aperture 185 of the flange 175 and then through the corresponding through-hole 145 of the support body 90, after which nuts 265 engage each of the fasteners 260 adjacent the back surface 105. As such, the surface 180 of the flange 175 substantially abuts and is in direct contact with the front surface 110 of the support body 90. Stated another way, the surface 180 of the flange 175 faces away from the mirror assembly 190 in a first direction along the rotational axis 65 and the front surface 110 of the support body 90 faces toward the mirror assembly 190 in a second direction along the rotational axis 65. The flange 175 is defined as a planar plate member radially extending from the first end 165 of the support arm 160 about the rotational axis 65. In another embodiment, the through-holes 145 may be internally threaded such that the flange 175 is coupled to the support body 90 by the fasteners 260 threadably engaging the internal threads of the through-holes 145 without utilizing the nuts 265. In this embodiment, the holes 145 may only extend partially into the support body 90 from the front surface 110 such that the holes 145 would not be defined as through-holes. In other embodiments, the four fasteners 260 may extending through the through-holes 145 from the back surface 105 and then extend through the apertures 185 of the flange 175 such that the nuts 265 engage the corresponding fastener 260 adjacent the flange 175. In other embodiments, the fasteners 260 may be fixedly coupled to the support body 90 or the flange 175 (e.g., fastener studs). In other embodiments, the flange 175 may partially encapsulate the support body 90 (e.g., the flange 175 may be configured to abut the bottom, top, front, first side, and/or second side surfaces 95, 100, 110, 115, 120). In this embodiment, the fasteners 260 may be oriented perpendicular to the rotational axis 65 to couple the flange 175 to the support body 90, or the fasteners 260 may be omitted and the support body 90 may be press-fit, adhered, brazed, or welded into engagement with the flange 175. In other embodiments, the support arm 160, the flange 175, and the support body 90 may be one integral member.

In the illustrated embodiment, the nut 80 is insertable within the slot 140 such that the drive assembly 50 can be coupled to the support body 90 and the support arm 160. In particular, the threaded stud 60 is insertable through the second recess 155 and the central aperture 125 to engage the nut 80 positioned within the slot 140. As the threaded stud 60 rotates about the rotational axis 65 and the support body 90 remains fixed relative to the threaded stud 60, the support body 90 and the support arm 160 move relative to the threaded stud 60 along the rotational axis 65. In particular, because the nut 80 is fixed within the slot 140, engagement between the threaded stud 60 and the nut 80 and the relative movement thereof enables movement of the support body 90. The threaded stud 60 extends through the support body 90 and into the guard 255, which is configured to inhibit contact between the support arm 160 and the threaded stud 60. In other embodiments, the guard 255 may be omitted and the threaded stud 60 may extend into the support arm 160.

In one embodiment, the housing 195 is simultaneously assembled with the support body 90 as the drive assembly 50 is coupled to the support body 90. The support body 90 is insertable within the first region 218 of the cavity 215 through the second end 205 of the housing 195. As such, a portion of the top surface 100 slidably engages the upper support ledges 225 and a portion of the bottom surface 95 engages the lower support ledges 220 with the channels 150, 230 aligning with each other. The engagement between the support body 90 and the housing 195 inhibits relative rotation between the support body 90, the support arm 160, and the housing 195. In other embodiments, the support body 90 may be coupled with the housing 195 before assembly of the drive assembly 50 and the support body 90. With reference back to FIG. 3, the end cap assembly 210 is assembled onto the support arm 160 by inserting the support arm 160 through the central apertures 238, 250 of the end cap assembly 210 near the second end 170 of the support arm 160. The housing 195 is then coupled to the pivot base 40 by fasteners 275 engaging the upper and lower support ledges 220, 225, and the mirror assembly 190 is coupled to the second end 170 of the support arm 160.

The assembly of the extendable mirror assemblies 10, as described above, is an example of an embodiment of the disclosure. The order of components being assembled or coupled together, as described above, is not limited to the disclosure herein. For example, other processes of assembly may alter the order of when components are coupled together.

With reference to FIGS. 1, 2, 7, and 8, the extendable mirror assemblies 10 are coupled to the cab 15 of the vehicle 20 by the mirror base 35. The operator within the cab 15 can then automatically retract (FIGS. 1 and 7) or extend (FIGS. 2 and 8) the extendable mirror assemblies 10 relative to the cab 15. In one embodiment, the operator can independently retract or extend one of the extendable mirror assemblies 10 and/or the operator can simultaneously retract or extend both extendable mirror assemblies 10. In particular, the operator actuates the drive assembly 50 for the threaded stud 60 to rotate in either the first rotational direction 70 or the second rotational direction 75.

When the threaded stud 60 rotates in the first direction 70, the support body 90 and the support arm 160 move toward the pivot base 40 into the retracted position (FIG. 7) because the support body 90 is inhibited to rotate with the threaded stud 60 (e.g., the support body 90 is only allowed to slide within the housing 195 along the rotational axis 65). Axial movement of the support body 90 is stopped by the stop 85 received within the second recess 155. In one embodiment, engagement between the stop 85 and the support body 90 stalls out the electric motor 55 to cease rotational movement of the threaded stud 60. In the retracted position, most of the support arm 160 is located within the housing 195 and the mirror assembly 190 is located substantially below the end cap assembly 210 at a first distance away from the connection between the mirror base 35 and the cab 15. Accordingly, the weight of the mirror assembly 190 produces a first moment 280 (FIG. 1) acting on various components of the extendable mirror assemblies 10 (e.g., a portion of the first moment force 280 acts on the connection between the support body 90, the flange 175, and the support arm 160).

In contrast, when the threaded stud 60 rotates in the second direction 75, the support body 90 and the support arm 160 move away from the pivot base 40 into the extended position (FIG. 8). Movement of the support body 90 is stopped by the flange 175 abutting the protrusions 236 of the stop member 235. In one embodiment, engagement between the stop member 235 and the flange 175 stalls out the electric motor 55 to cease rotational movement of the threaded stud 60. In the extended position, most of the support arm 160 extends out of the housing 195 such that the weight of the mirror assembly 190 (at a second distance away from the connection between the mirror base 35 and the cab 15 greater than the first distance) produces a second moment 285 (FIG. 2), which is greater than the first moment force 280 and acts on various components of the extendable mirror assemblies 10 (e.g., a portion of the second moment 285 acts on the connection between the support body 90, the flange 175, and the support arm 160).

The invention claimed is:

1. An extendable mirror assembly configured to be coupled to a vehicle, the extendable mirror assembly comprising:
   a drive assembly;
   a mirror moveable between a retracted position and an extended position;
   a support arm including a first end opposite a second end, the second end of the support arm coupled to the mirror;
   a flange coupled to the first end of the support arm; and
   a support body coupled to the support arm by the flange, the support body configured to translate along an axis in response to actuation of the drive assembly to move the mirror between the retracted position and the extended position, wherein the flange is secured to the support body by fasteners extending parallel to the axis.

2. The extendable mirror assembly of claim 1, wherein the flange presents a first contact surface facing away from the mirror in a first direction along the axis, and wherein the support body presents a second surface facing toward the mirror in a second direction along the axis.

3. The extendable mirror assembly of claim 2, wherein the first and second surfaces each define a plane perpendicular to the axis.

4. The extendable mirror assembly of claim 1, wherein the flange is welded to the support arm.

5. The extendable mirror assembly of claim 1, wherein the flange is in the form of a plate member extending from the support arm radially from the axis.

6. The extendable mirror assembly of claim 1, wherein the flange is configured for coupling to the support body at four spaced-apart fastening points.

7. The extendable mirror assembly of claim 1, wherein the support body includes a plurality of apertures oriented parallel to the axis, and wherein the flange includes a plurality of apertures, each of which aligns with one of the plurality of apertures of the support body, and wherein each of the plurality of apertures of the support body and the flange receives one of the fasteners.

8. A vehicle comprising:
   a cab for supporting an operator of the vehicle; and
   an extendable mirror assembly including
      a mirror base coupled to the vehicle adjacent the cab,
      a drive assembly coupled to the mirror base and operable to move a mirror between a retracted position and an extended position,
      a support arm including a first end and a second end, the second end coupled to the mirror,
      a fastening interface member fixedly attached to the first end of the support arm, and
      a support body coupled to the support arm by the fastening interface member, the support body cooperatively engaged with the drive assembly to move along an axis defined by the drive assembly for movement of the mirror between the retracted position and the extended position, wherein the fastening interface member is secured to the support body by fasteners extending parallel to the axis.

9. The vehicle of claim 8, wherein the fastening interface member includes a first surface facing away from the mirror in a first direction along the axis, and wherein the support body includes a second surface facing toward the mirror in a second direction along the axis, and wherein the surfaces of the fastening interface member and the support body abut during operation of the drive assembly.

10. The vehicle of claim 8, wherein the fastening interface member includes a first surface defining a first plane coincident therewith, and wherein the support body includes a second surface defining a second plane coincident therewith, and wherein the first and second planes are perpendicular to the axis.

11. The vehicle of claim 8, wherein the fastening interface member is a plate member extending radially with respect to the axis.

12. An extendable mirror assembly configured to be coupled to a vehicle, the extendable mirror assembly comprising:
 a drive assembly;
 a mirror moveable between a retracted position and an extended position;
 a support arm including a first end opposite a second end, the second end of the support arm coupled to the mirror;
 a fastening interface member coupled to the first end of the support arm; and
 a support body coupled to the support arm by the fastening interface member, the support body configured to translate along an axis in response to actuation of the drive assembly to move the mirror between the retracted position and the extended position, wherein the support body includes a plurality of apertures oriented parallel to the axis, and wherein the fastening interface member includes a plurality of apertures, each of which aligns with one of the plurality of apertures of the support body during operation of the drive assembly.

* * * * *